(12) United States Patent
Cho et al.

(10) Patent No.: US 10,962,094 B2
(45) Date of Patent: Mar. 30, 2021

(54) CONTINUOUSLY VARIABLE POWERTRAIN FOR VEHICLE

(71) Applicants: HYUNDAI MOTOR COMPANY, Seoul (KR); KIA MOTORS CORPORATION, Seoul (KR)

(72) Inventors: Il Dae Cho, Gwangmyeong-si (KR); Sung Hoon Park, Seongnam-si (KR); Hyu Tae Shim, Hwaseong-si (KR); In Chan Kim, Yongin-si (KR); Tae Seok Seo, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 68 days.

(21) Appl. No.: 16/434,764

(22) Filed: Jun. 7, 2019

(65) Prior Publication Data
US 2020/0263771 A1  Aug. 20, 2020

(30) Foreign Application Priority Data

Feb. 20, 2019  (KR) .................... 10-2019-0019827

(51) Int. Cl.
  *F16H 37/10*  (2006.01)
  *F16H 37/08*  (2006.01)
(52) U.S. Cl.
  CPC . *F16H 37/0846* (2013.01); *F16H 2037/0866* (2013.01)
(58) Field of Classification Search
  CPC ...... F16H 37/10; F16H 37/022; F16H 37/086; F16H 37/0846; F16H 2037/0866; F16H 2037/104

USPC ........................................................ 475/210
See application file for complete search history.

(56) References Cited

U.S. PATENT DOCUMENTS

| | | | | |
|---|---|---|---|---|
| 4,864,889 A * | 9/1989 | Sakakibara | ......... | F16H 37/0846 475/211 |
| 8,303,459 B2 * | 11/2012 | Kawai | ................... | F16H 37/027 475/210 |
| 9,482,337 B2 * | 11/2016 | Hattori | ................ | F16H 61/0437 |
| 9,494,204 B2 * | 11/2016 | Matsuo | .................... | F16D 48/08 |
| 9,849,885 B2 * | 12/2017 | Sakamoto | ............... | F16D 48/06 |
| 9,970,522 B2 * | 5/2018 | Fujita | ...................... | F16H 59/44 |
| 10,451,126 B2 * | 10/2019 | Ohgata | ............... | F16H 61/0276 |
| 10,641,371 B2 * | 5/2020 | Cho | ....................... | F16H 37/022 |

(Continued)

FOREIGN PATENT DOCUMENTS

KR  10-2016-0130012 A  11/2016

OTHER PUBLICATIONS

U.S. Non-Final Office Action dated Dec. 4, 2019 issued in U.S. Appl. No. 16/196,981.

*Primary Examiner* — Leslie A Nicholson, III
(74) *Attorney, Agent, or Firm* — Morgan, Lewis & Bockius LLP

(57) ABSTRACT

A powertrain may include an input shaft; a drive pulley and a driven pulley engaged to each other by a belt; a forward/backward switching mechanism provided to selectively switch a direction of power from the input shaft to the drive pulley by a plurality of friction members and transmit the power; a gear train provided to transmit the power of the input shaft to a rotation shaft of the driven pulley without passing through the drive pulley; and another friction member provided to interrupt a power transmission path of the gear train.

11 Claims, 10 Drawing Sheets

(56) References Cited

U.S. PATENT DOCUMENTS

2015/0354682 A1  12/2015  Yamamoto et al.
2016/0025161 A1   1/2016  Matsu et al.
2016/0052522 A1   2/2016  Matsuo et al.
2016/0091090 A1   3/2016  Kimura et al.
2016/0131255 A1   5/2016  Taninaka et al.
2017/0037965 A1   2/2017  Inoue et al.

* cited by examiner

FIG. 2

|    | N | R | D | |
|---|---|---|---|---|
|    |   |   | BELT | GEAR |
| B1 | X | O | X | X |
| C1 | X | X | O | X |
| C2 | X | X | X | O | ns
CONTINUOUSLY VARIABLE POWERTRAIN FOR VEHICLE

CROSS REFERENCE TO RELATED APPLICATION

The present application claims priority to Korean Patent Application No. 10-2019-0019827, filed Feb. 20, 2019, the entire contents of which is incorporated herein for all purposes by this reference.

BACKGROUND OF THE INVENTION

Field of the Invention

The present invention relates to a continuously variable powertrain for a vehicle. More particularly, the present invention relates to a technology for improving power transmission efficiency.

Description of Related Art

A continuously variable transmission changes the transmission ratio continuously so that an engine can be driven at a more efficient driving point to improve fuel efficiency.

However, a conventional belt-type continuously variable transmission has a problem in that the power transmission efficiency is low due to dragging of the pulley and the belt, slip prevention, etc. in a state where the transmission ratio is at a high stage having a relatively small transmission ratio or at a low stage having a relatively large transmission ratio.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a continuously variable powertrain for a vehicle, wherein it is possible to avoid a phenomenon in which the power transmission efficiency is lowered in a state where the transmission ratio is at a high stage having a relatively small transmission ratio or at a low stage having a relatively large transmission ratio, so that the present invention ensures the more efficient power transmission performance in a wide transmission ratio range, contributing to improvement in fuel efficiency of the vehicle and ensuring excellent driving characteristics of the vehicle.

In various aspects of the present invention, there is provided a continuously variable powertrain for a vehicle, the powertrain including: an input shaft; a drive pulley and a driven pulley engaged to each other by a belt; a forward/backward switching mechanism provided to selectively switch a direction of power from the input shaft to the drive pulley by a plurality of friction members and transmit the power; a gear train provided to transmit the power of the input shaft to a rotation shaft of the driven pulley without passing through the drive pulley; and another friction member provided to interrupt a power transmission path of the gear train.

The forward/backward switching mechanism may include: a planetary gear set; and a first clutch and a brake, as the plurality of friction members, connected to rotation elements of the planetary gear set, respectively.

The planetary gear set may have a double pinion planetary gear set; and a sun gear of the double pinion planetary gear set may be directly connected to the input shaft, a carrier thereof may be directly connected to the drive pulley and be connected to the input shaft via the first clutch, and a ring gear thereof may be selectively connectable to a transmission housing by the brake.

The planetary gear set may have a double pinion planetary gear set; and a sun gear of the double pinion planetary gear set may be directly connected to the drive pulley and be connected to the input shaft via the first clutch, a carrier thereof may be directly connected to the input shaft, and a ring gear thereof may be selectively connectable to a transmission housing by the brake.

The planetary gear set may have a single pinion planetary gear set; and a sun gear of the single pinion planetary gear set may be directly connected to the drive pulley and be connected to the input shaft via the first clutch, a carrier thereof may be selectively connectable to a transmission housing by the brake, and a ring gear thereof may be directly connected to the input shaft.

The planetary gear set may have a single pinion planetary gear set; and a sun gear of the single pinion planetary gear set may be directly connected to the input shaft, a carrier thereof may be selectively connectable to a transmission housing by the brake, and a ring gear thereof may be directly connected to the drive pulley and be connected to the sun gear via the first clutch.

The gear train may include a drive gear fixedly mounted to the input shaft, a driven gear rotatably mounted on the rotation shaft of the driven pulley, and an idler gear connecting the drive gear and the driven gear together in gear engagement; and the another friction member provided to interrupt the power transmission path of the gear train may have a second clutch configured to connect or interrupt the driven gear to or from the rotation shaft of the driven pulley.

The idler gear may have a first idler gear engaged with the drive gear, and a second idler gear engaged with the driven gear; and the first idler gear and the second idler gear may have different diameters.

The gear train may include a drive gear rotatably mounted to the input shaft, a driven gear fixedly mounted to the rotation shaft of the driven pulley, and an idler gear connecting the drive gear and the driven gear together in external gear engagement; and the another friction member provided to interrupt the power transmission path of the gear train may have a second clutch configured to selectively connect the drive gear to the input shaft.

The idler gear may have a first idler gear engaged with the drive gear, and a second idler gear engaged with the driven gear; and the first idler gear and the second idler gear may have different diameters.

The gear train may include a drive gear fixedly mounted to the input shaft, a driven gear fixedly mounted to the rotation shaft of the driven pulley, and an idler gear connecting the drive gear and the driven gear together in external gear engagement; the idler gear may have a first idler gear engaged with the drive gear, and a second idler gear engaged with the driven gear; and the another friction member provided to interrupt the power transmission path of the gear train may have a second clutch configured to selectively connect the first idler gear or the second idler gear to an idler shaft to which the first idler gear and the second idler gear are fixedly mounted.

The drive pulley, the driven pulley, and the belt may be configured to achieve continuously variable speed change by changing contact diameters of the drive pulley and the driven pulley with the belt; and the gear train may be configured to achieve continuity with a transmission ratio achievable by the drive pulley, the driven pulley, and the belt, and to form a transmission ratio outside a transmission ratio range implemented by the powertrain.

The rotation shaft of the driven pulley may be rotatably provided with an output gear to output power to a drive wheel.

The drive pulley, the driven pulley, and the belt may be configured to achieve continuously variable speed change by changing contact diameters of the drive pulley and the driven pulley with the belt; and the gear train may be configured to achieve continuity with a transmission ratio achievable by the drive pulley, the driven pulley, and the belt, and to form a transmission ratio at a lower stage having a larger transmission ratio or at a higher stage having a smaller transmission ratio than a transmission ratio implemented by the powertrain.

According to an exemplary embodiment of the present invention, it is advantageous in that it is possible to avoid a phenomenon in which the power transmission efficiency is lowered in a state where the transmission ratio is at a high stage having a relatively small transmission ratio or at a low stage having a relatively large transmission ratio, so that the present invention ensures more efficient power transmission performance in a wide transmission ratio range, contributing to improvement in fuel efficiency of the vehicle and ensuring excellent driving characteristics of the vehicle.

It is further advantageous in that when the gear train is configured to provide a gear ratio just outside the continuously variable transmission range through the drive pulley, the driven pulley, and the belt, the vehicle can realize a wider range of transmission ratio, which can lead to an improvement in the fuel efficiency and the power performance of the vehicle.

It is further advantageous in that when the gear train is configured to provide a gear ratio corresponding to the upper limit or the lower limit of the continuously variable transmission range through the drive pulley, the driven pulley, and the belt, the entire power transmission efficiency of the vehicle may be improved by reducing the width of the transmission ratio in which the efficiency by the continuously variable speed change is somewhat lowered.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

Figure 2:
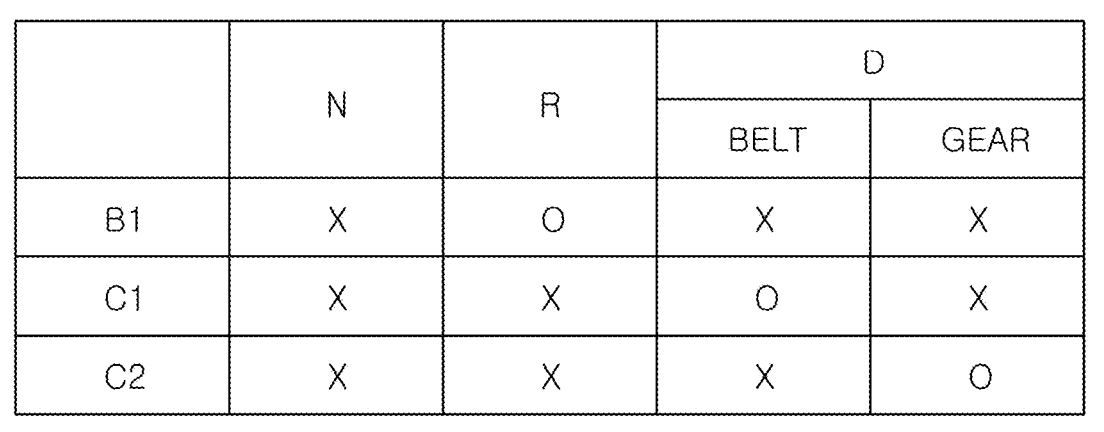

FIG. 2 is a diagram showing shift ranges implemented by the powertrain of FIG. 1 and the operating states of friction members accordingly;

Figure 1:
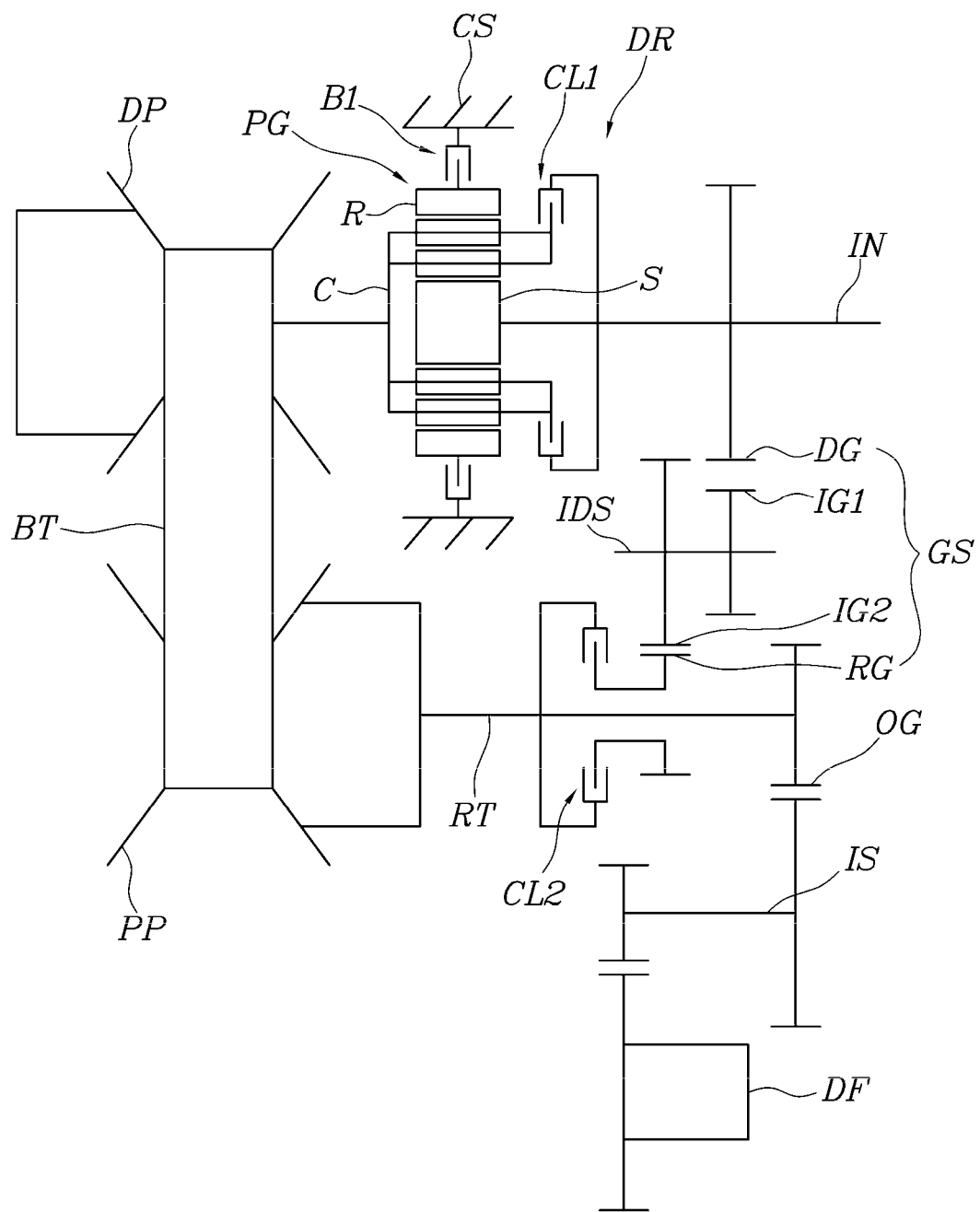
FIG. 1 is a schematic diagram showing various exemplary embodiments of a continuously variable powertrain for a vehicle according to an exemplary embodiment of the present invention.
Figure 3:
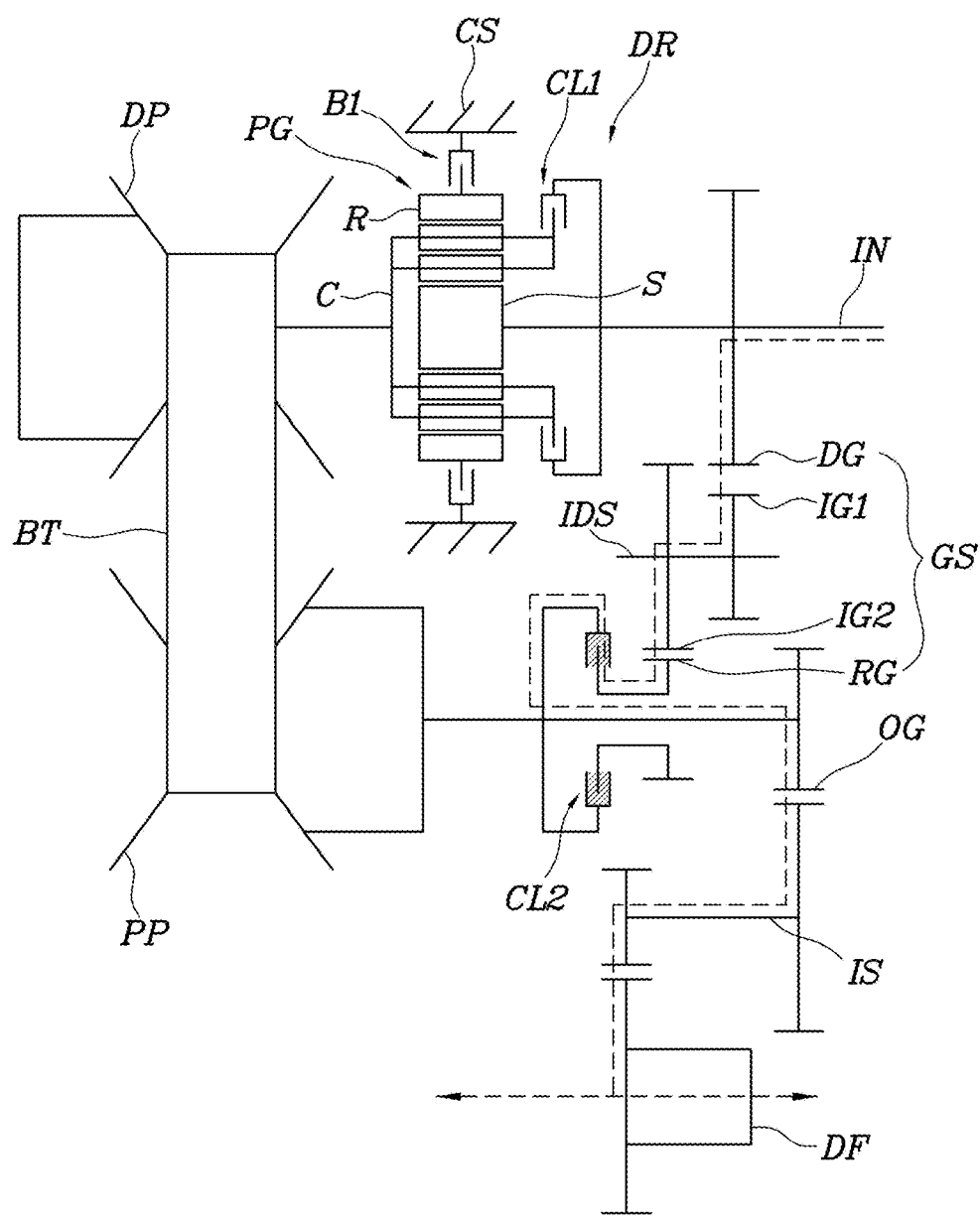
FIG. 3 is a view showing a state where the powertrain of FIG. 1 implements D-range using a gear train.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, an exemplary embodiment of the present invention will be described in detail with reference to the accompanying drawings.

Referring to FIGS. 1 to 10, a continuously variable powertrain for a vehicle according to an exemplary embodiment of the present invention include: an input shaft IN; a drive pulley DP and a driven pulley PP engaged to each other by a belt BT; a forward/backward switching mechanism DR provided to selectively switch a direction of power from the input shaft IN to the drive pulley DP by a plurality of friction members and transmit the power; a gear train GS provided to transmit the power of the input shaft IN to a rotation shaft of the driven pulley PP; and another friction member provided to interrupt a power transmission path of the gear train GS.

Herein, the drive pulley DP, the driven pulley PP, and the belt BT forms a continuously variable transmission configured to continuously variable speed change by changing contact diameters of the drive pulley and the driven pulley with the belt.

In other words, the present invention is configured to switch between a state where the continuously variable speed change is performed through the belt BT between the drive pulley DP and the driven pulley PP to output the power, and a state where the power is output through the gear train GS when an engine or the like is connected to the input shaft IN to provide power.

The belt BT includes all parts that can form a closed curve and transmit power by a frictional force with the pulley such as a chain type belt BT formed by connection of a plurality of link plates and a locker pin, as well as a belt BT of a type in which a plurality of elements are combined with a ring used in a conventional CVT.

the gear train GS is configured to achieve continuity with a transmission ratio achievable by the drive pulley DP, the driven pulley PP, and the belt BT, and to form a transmission ratio outside a transmission ratio range implemented by the powertrain.

In other words, assuming that the transmission ratio range implemented by the continuously variable transmission by the belt BT is 3 to 0.95, the transmission ratio formed by the gear train GS is set to 3 or more, for example, 3.5, so that the lowest gear stage may be implemented by the gear train GS, or the transmission ratio formed by the gear train GS is set to 0.95 or less, for example, 0.9, so that the overdrive gear stage, which is the highest gear stage, may be implemented by the gear train GS.

The forward/backward switching mechanism DR includes: a planetary gear set PG; and a first clutch CL1 and a brake B1, as the plurality of friction members, connected to rotation elements of the planetary gear set PG, respectively.

In the exemplary embodiment of FIG. 1, the planetary gear set PG includes a double pinion planetary gear set; and a sun gear S of the double pinion planetary gear set is directly connected to the input shaft IN, a carrier C thereof is directly connected to the drive pulley DP and is selectively connectable to the input shaft IN via the first clutch CL1, and a ring gear R thereof is selectively connectable to a transmission housing CS by the brake B1.

Accordingly, as shown in FIGS. 2 to 5, in the D-range state indicating the forward moving of the vehicle, the brake B1 is not engaged, and only in the R-range state indicating the reverse moving of the vehicle, the brake B1 is engaged such that the power input to the sun gear S is reversed to the carrier C and is supplied to the drive pulley DP, implementing the reverse speed.

The gear train GS includes: a drive gear DG provided to be rotated along with the input shaft IN; a driven gear RG rotatably mounted on the rotation shaft RT of the driven pulley PP; and an idler gear connecting the drive gear DG and the driven gear RG together in external gear engagement. The another friction member provided to interrupt the power transmission path of the gear train GS includes a second clutch CL2 configured to connect or interrupt the driven gear RG to or from the rotation shaft RT of the driven pulley PP.

The idler gear includes a first idler gear IG1 engaged with the drive gear DG, and a second idler gear IG2 engaged with the driven gear RG, wherein the first idler gear IG1 and the second idler gear IG2 are fixed to an idler shaft IDS and have different diameters.

Accordingly, the difference in diameter between the first idler gear IG1 and the second idler gear IG2 allows for a more flexible implementation of the desired transmission ratio. In other words, as shown in FIG. 1, if the diameter of the first idler gear IG1 is smaller than the diameter of the second idler gear IG2, a larger reduction ratio may be obtained compared to case of having the same diameter.

According to the various exemplary embodiments configured as described above, as shown in FIG. 3, D-range is implemented by the gear train GS, wherein the highest gear stage or the lowest gear stage is implemented depending on the transmission ratio implemented by the gear train GS.

In other words, the power of the input shaft IN is transmitted to the driven gear RG through the drive gear DG and the idler gear, and here, since the second clutch CL2 is engaged, the power transmitted to the driven gear RG is transmitted to the rotation shaft of the driven pulley PP and then is transmitted to the differential DF through an intermediate shaft IS, whereby the power of the input shaft IN is transmitted to a drive wheel connected to the differential DF only through the gear train GS without through the belt BT.

This state can realize high power transmission efficiency by the gear train GS, which can reduce the power consumption and improve the fuel efficiency of the vehicle. If the gear train GS is configured to form the overdrive transmission ratio, which is the highest gear stage, the vehicle provides a state of high power transmission efficiency during high-speed cruise control, contributing to improvement in fuel efficiency of the vehicle.

For reference, in the exemplary embodiments of the present invention, the rotation shaft of the driven pulley PP is rotatably provided with an output gear OG, and the intermediate shaft IS is connected to the output gear OG, then the differential DF is connected to the intermediate shaft IS, but the intermediate shaft may be omitted.

Figure 4:
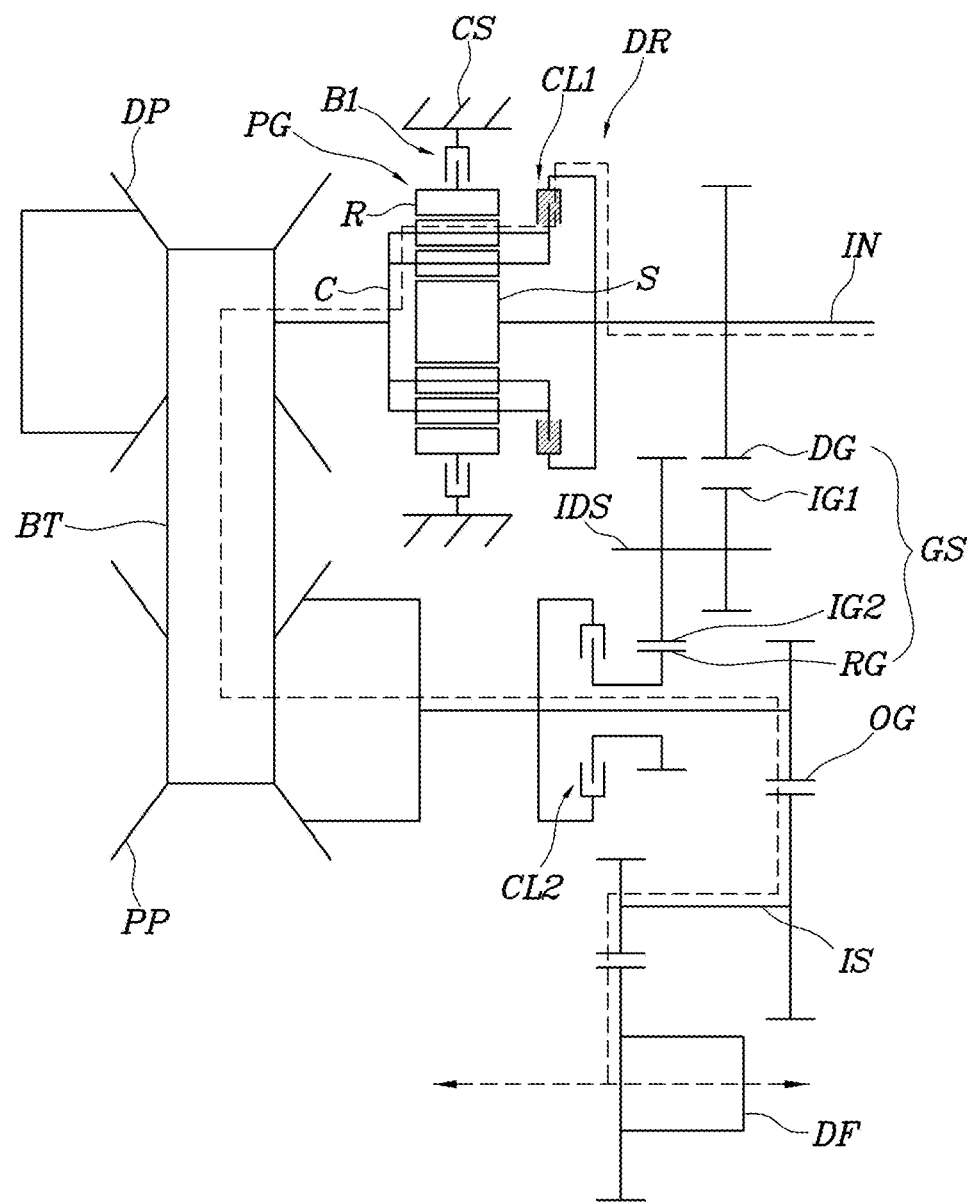
FIG. 4 is a view showing a state where the powertrain of FIG. 1 implements D-range using a belt.

FIG. 4 shows a state where D-range is implemented by the drive pulley DP, the driven pulley PP, and the belt BT, wherein the first clutch CL1 is engaged such that the power of the input shaft IN is transmitted directly to the drive pulley DP by the first clutch CL1 and then is output to the rotation shaft of the driven pulley PP via the belt BT.

This state is a general transmission ratio state, and a vehicle can be driven In the instant state.

Figure 5:
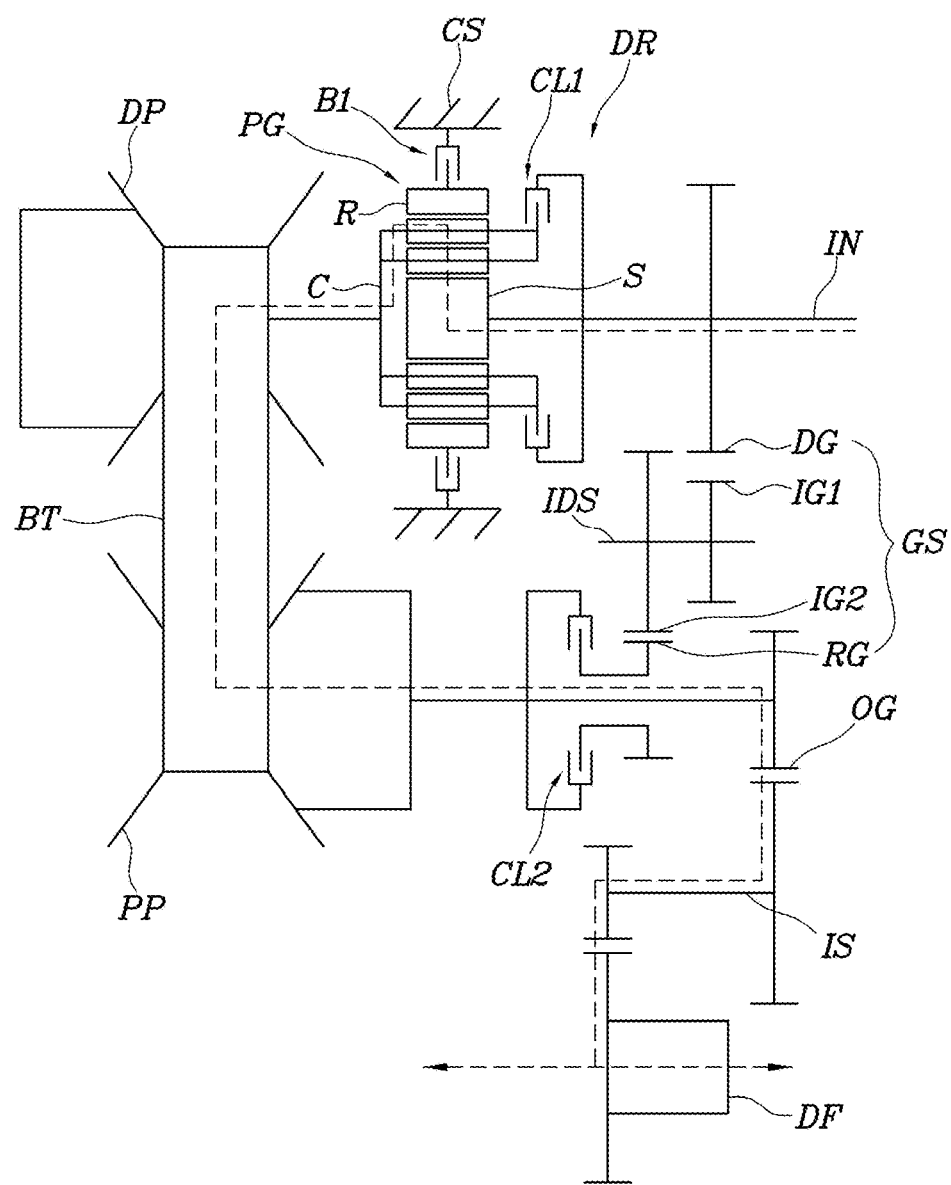
FIG. 5 is a view showing a state where the powertrain of FIG. 1 implements R-range.

FIG. 5 shows an R-range state for implementing the reverse operation, wherein the brake B1 is engaged such that the power of the input shaft IN is reversed in the carrier C and is supplied to the drive pulley DP, and the power transmitted to the rotation shaft of the driven pulley PP is also reversed to implement the reverse speed.

Figure 6:
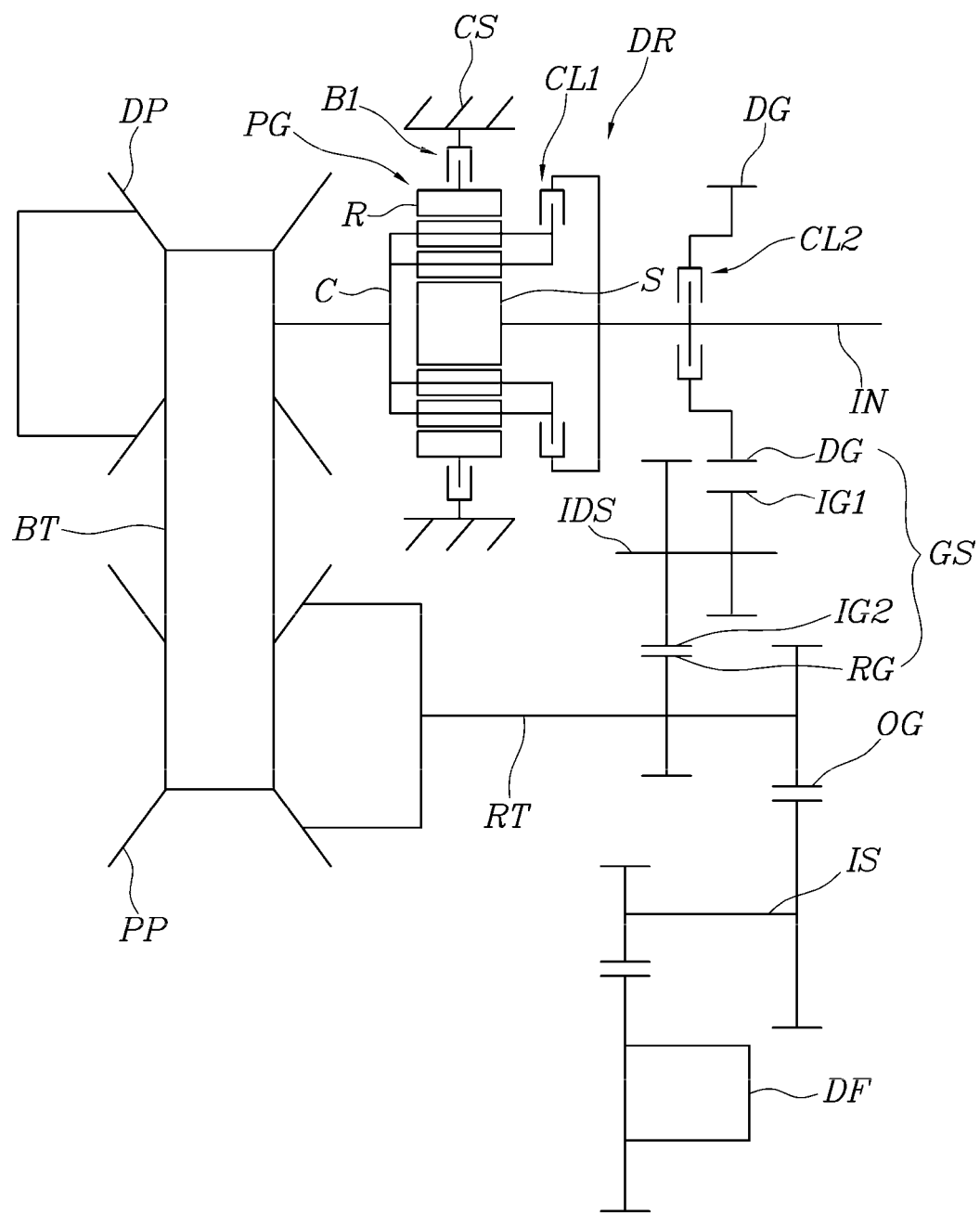
FIG. 6 is a view showing various exemplary embodiments of the present invention.

FIG. 6 shows the various exemplary embodiments of the present invention, wherein the other configuration is the same as the various exemplary embodiments of the present invention, except that the position of the second clutch CL2, which is provided to interrupt the power transmission path of the gear train GS, is changed to a position between the drive gear DG and the input shaft IN.

In other words, the gear train GS includes: the drive gear DG rotatably provided in the input shaft IN; the driven gear RG provided to be rotated along with the rotation shaft of the driven pulley PP; and the idler gear connecting the drive gear DG and the driven gear RG together in external gear engagement. The another friction member provided to interrupt the power transmission path of the gear train GS includes the second clutch CL2 configured to connect or interrupt the drive gear DG to or from the input shaft IN.

Furthermore, the idler gear includes a first idler gear IG1 engaged with the drive gear DG, and a second idler gear IG2 engaged with the driven gear RG.

Figure 7:
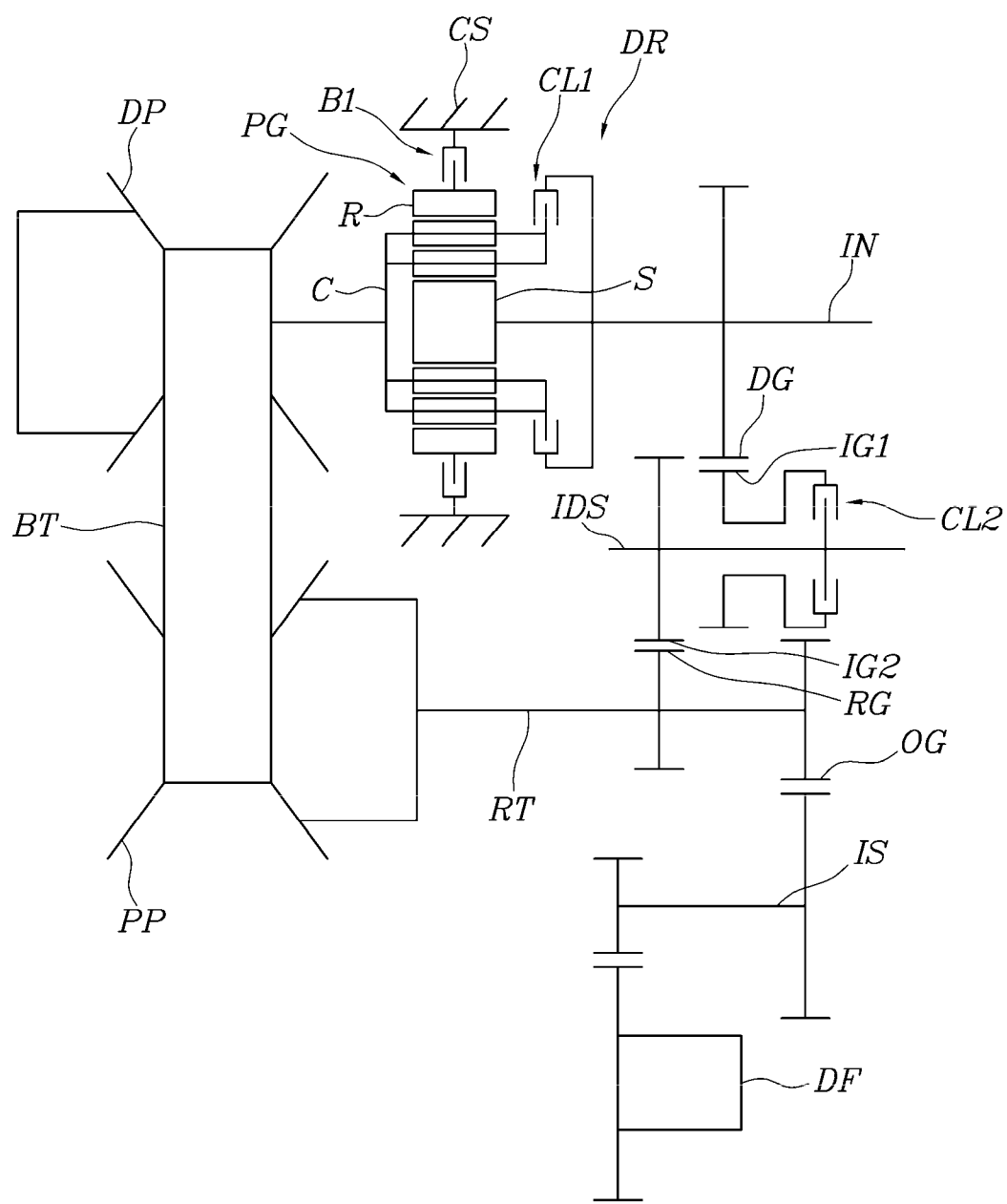
FIG. 7 is a view showing various exemplary embodiments of the present invention.

FIG. 7 shows the various exemplary embodiments of the present invention, wherein the other configuration is the same as the various exemplary embodiments of the present invention, except that the position of the second clutch CL2, which is provided to interrupt the power transmission path of the gear train GS, is changed to a position between the idler gear and an idler shaft IDS.

In other words, the gear train GS includes: the drive gear DG rotatably provided in the input shaft IN; the driven gear RG provided to be rotated along with the rotation shaft of the driven pulley PP; and the idler gear connecting the drive gear DG and the driven gear RG together in external gear engagement, wherein the idler gear includes the first idler gear IG1 engaged with the drive gear DG, and the second idler gear IG2 engaged with the driven gear RG; and the another friction member provided to interrupt the power transmission path of the gear train GS includes the second clutch CL2 configured to connect or interrupt the first idler gear IG1 or the second idler gear IG2 to or from the idler shaft IDS.

For reference, in FIG. 7, the first idler gear IG1 is provided to be connected to or interrupted from the idler shaft IDS by the second clutch CL2. Of course, the second clutch CL2 may be provided between the second idler gear IG2 and the idler shaft IDS.

Figure 8:
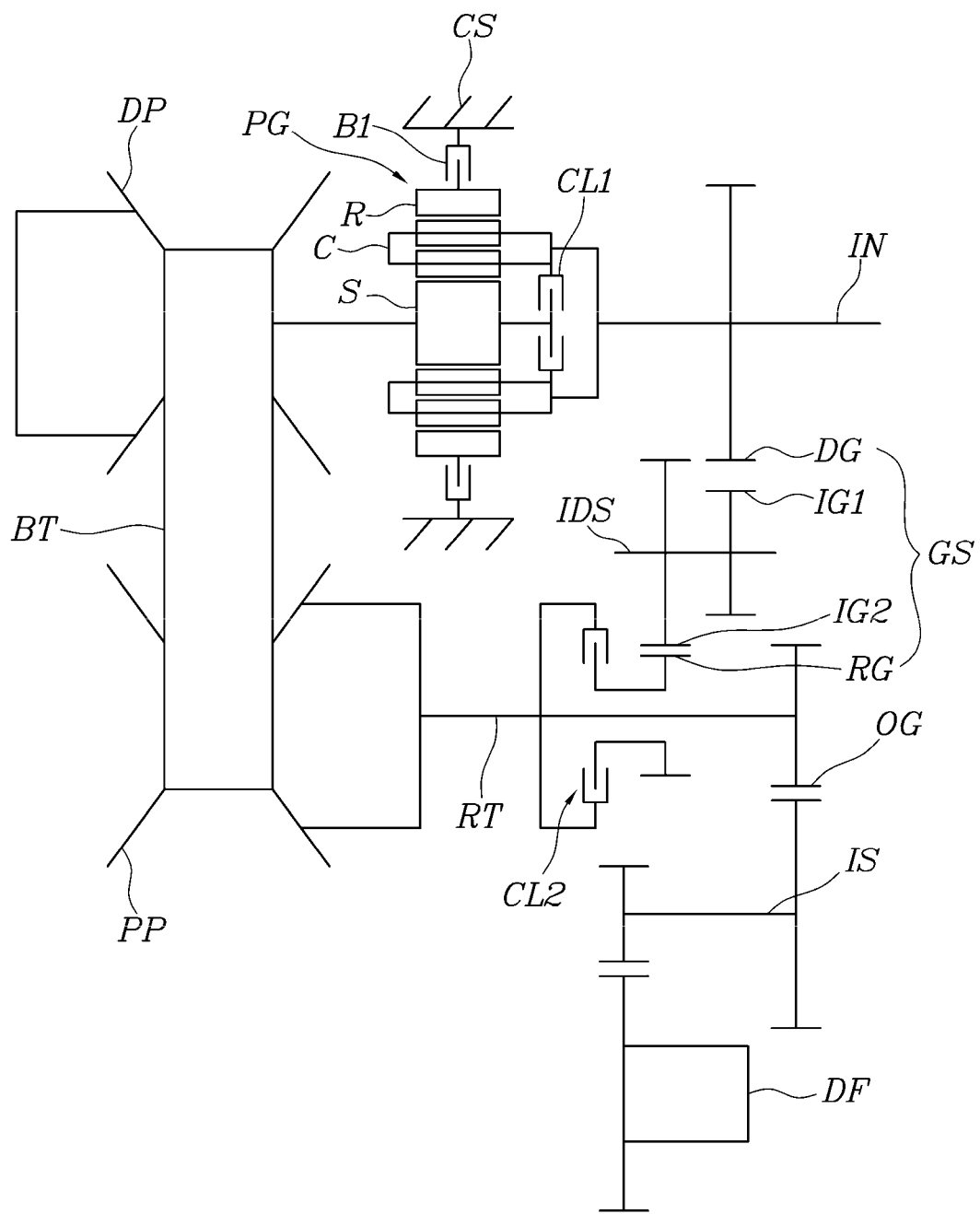
FIG. 8 is a view showing various exemplary embodiments of the present invention.

FIG. 8 shows the various exemplary embodiments of the present invention, which differs from the various exemplary embodiments of FIG. 1 in the configuration of the forward/backward switching mechanism DR.

In other words, the planetary gear set PG includes a double pinion planetary gear set; and a sun gear S of the double pinion planetary gear set is directly connected to the drive pulley DP and is selectively connectable to the input shaft IN via the first clutch CL1, a carrier C thereof is directly connected to the input shaft IN, and a ring gear R thereof is selectively connectable to the transmission housing CS by the brake B1.

Figure 9:
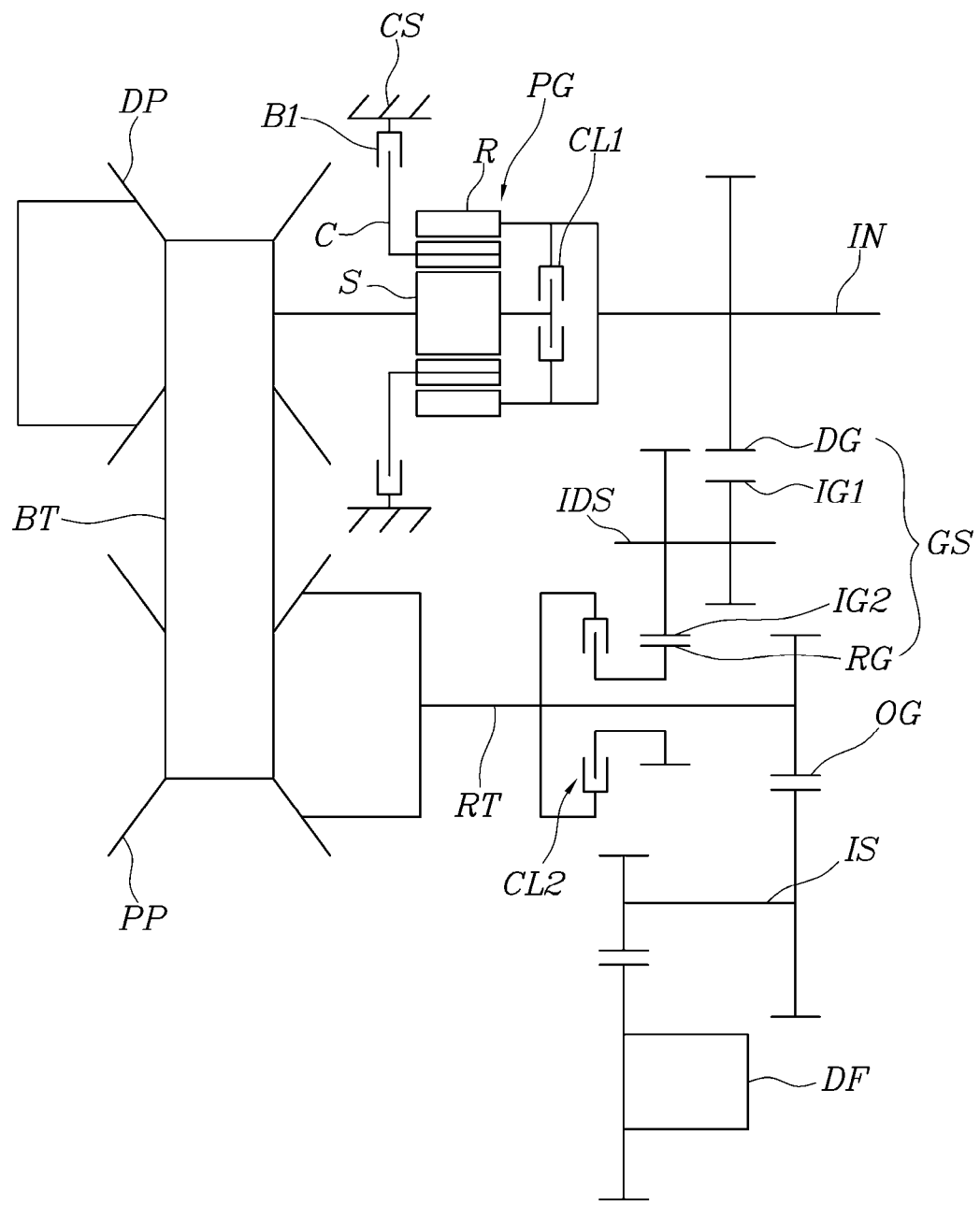
FIG. 9 is a view showing various exemplary embodiments of the present invention.

FIG. 9 shows the various exemplary embodiments of the present invention, which differs from the various exemplary embodiments of FIG. 1 in the configuration of the forward/backward switching mechanism DR.

In other words, the planetary gear set PG includes a single pinion planetary gear set; and a sun gear S of the single pinion planetary gear set is directly connected to the drive pulley DP and is selectively connectable to the input shaft IN via the first clutch CL1, a carrier C thereof is selectively connectable to the transmission housing CS by the brake B1, and a ring gear R thereof is directly connected to the input shaft IN.

Figure 10:
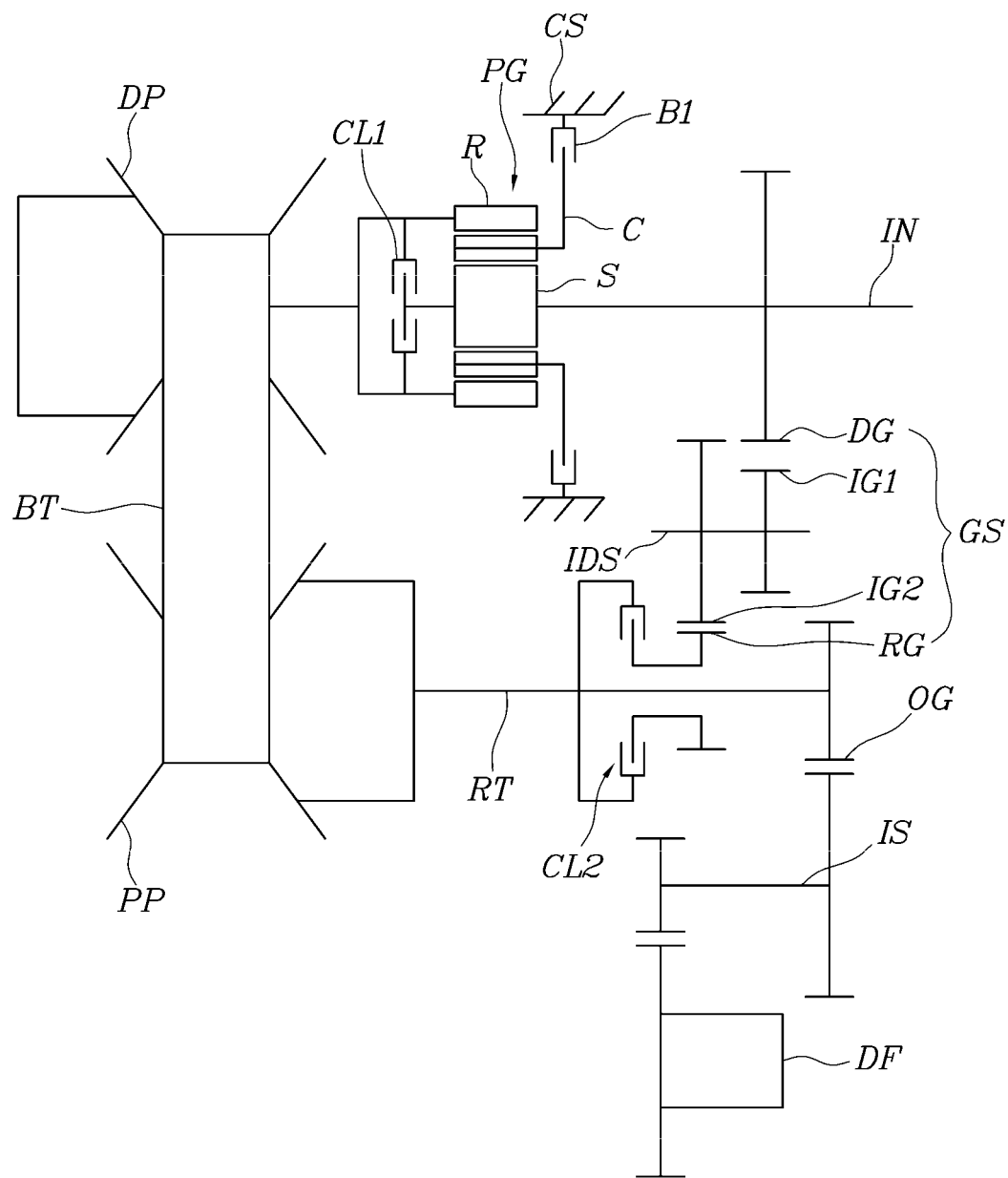
FIG. 10 is a view showing various exemplary embodiments of the present invention.

FIG. 10 shows the various exemplary embodiments of the present invention, which differs from the various exemplary embodiments of FIG. 1 in the configuration of the forward/backward switching mechanism DR.

In other words, the planetary gear set PG includes a single pinion planetary gear set; and a sun gear S of the single pinion planetary gear set is directly connected to the input shaft IN, a carrier C thereof is selectively connectable to the transmission housing CS by the brake B1, and a ring gear R thereof is directly connected to the drive pulley DP and is selectively connectable to the sun gear S via the first clutch CL1.

Of course, it is possible to adopt the gear train GS structure of FIG. 6 or 7 in the fourth to various exemplary embodiments of FIGS. 8 to 10.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A continuously variable powertrain apparatus comprising:
   an input shaft;
   a drive pulley and a driven pulley engaged to each other by a belt;
   a switching mechanism engaged to the input shaft and the drive pulley to selectively switch a direction of power from the input shaft to the drive pulley by a plurality of first friction members and transmit the power;
   a gear train engaged to the input shaft and a rotation shaft of the driven pulley to transmit a power of the input shaft to the rotation shaft of the driven pulley; and
   a second friction member provided to selectively interrupt a power transmission path of the gear train,
   wherein the switching mechanism includes:
      a planetary gear set including a plurality of rotation elements having a first rotation element and a second rotation element; and
      the plurality of first friction members including a first clutch and a brake connected to the first and second rotation elements of the planetary gear set, respectively,
   wherein the planetary gear set includes a double pinion planetary gear set including the plurality of rotation elements, and
   wherein the plurality of rotation elements of the double pinion planetary gear set include:
      a carrier, as the first rotation element, fixedly connected to the drive pulley and selectively connectable to the input shaft via the first clutch;
      a ring gear, as the second rotation element, selectively connectable to a transmission housing by the brake; and
      a sun gear, as a third rotation element, fixedly connected to the input shaft.

2. The continuously variable powertrain apparatus of claim 1,
   wherein the gear train includes:
      a drive gear fixedly mounted to the input shaft;
      a driven gear rotatably mounted on the rotation shaft of the driven pulley; and
      an idler gear engaged to the drive gear and the driven gear, and
   wherein the second friction member includes a second clutch configured to selectively connect the driven gear to the rotation shaft of the driven pulley.

3. The continuously variable powertrain apparatus of claim 2,
   wherein the idler gear includes a first idler gear engaged with the drive gear, and a second idler gear engaged with the driven gear, and
   wherein the first idler gear and the second idler gear have different diameters.

4. The continuously variable powertrain apparatus of claim 1,
   wherein the gear train includes:
      a drive gear rotatably mounted to the input shaft;
      a driven gear fixedly mounted to the rotation shaft of the driven pulley; and an idler gear engaged to the drive gear and the driven gear, and wherein the second friction member includes a second clutch configured to selectively connect the drive gear to the input shaft.

5. The continuously variable powertrain apparatus of claim 4,
wherein the idler gear includes a first idler gear engaged with the drive gear, and a second idler gear engaged with the driven gear, and
wherein the first idler gear and the second idler gear have different diameters.

6. The continuously variable powertrain apparatus of claim 1,
wherein the gear train includes:
a drive gear fixedly mounted to the input shaft;
a driven gear fixedly mounted to the rotation shaft of the driven pulley; and
an idler gear engaged to the drive gear and the driven gear,
wherein the idler gear includes a first idler gear engaged with the drive gear, and a second idler gear engaged with the driven gear, and
wherein the second friction member includes a second clutch configured to selectively connect the first idler gear or the second idler gear to an idler shaft to which the first idler gear and the second idler gear are fixedly mounted.

7. The continuously variable powertrain apparatus of claim 1,
wherein the drive pulley, the driven pulley, and the belt are configured to achieve continuously variable speed change by changing contact diameters of the drive pulley and the driven pulley with the belt, and
wherein the gear train is configured to achieve continuity with a transmission ratio achievable by the drive pulley, the driven pulley, and the belt, and to form a transmission ratio outside a transmission ratio range implemented by the continuously variable powertrain apparatus.

8. The continuously variable powertrain apparatus of claim 1,
wherein the rotation shaft of the driven pulley is rotatably provided with an output gear to output power to a drive wheel.

9. The continuously variable powertrain apparatus of claim 1,
wherein the drive pulley, the driven pulley, and the belt are configured to achieve continuously variable speed change by changing contact diameters of the drive pulley and the driven pulley with the belt, and
wherein the gear train is configured to achieve continuity with a transmission ratio achievable by the drive pulley, the driven pulley, and the belt, and to form a transmission ratio at a lower stage having a larger transmission ratio or at a higher stage having a smaller transmission ratio than a transmission ratio implemented by the continuously variable powertrain apparatus.

10. A continuously variable powertrain apparatus comprising:
an input shaft;
a drive pulley and a driven pulley engaged to each other by a belt;
a switching mechanism engaged to the input shaft and the drive pulley to selectively switch a direction of power from the input shaft to the drive pulley by a plurality of first friction members and transmit the power;
a gear train engaged to the input shaft and a rotation shaft of the driven pulley to transmit a power of the input shaft to the rotation shaft of the driven pulley; and
a second friction member provided to selectively interrupt a power transmission path of the gear train,
wherein the switching mechanism includes:
a planetary gear set including a plurality of rotation elements having a first rotation element and a second rotation element; and
the plurality of first friction members including a first clutch and a brake connected to the first and second rotation elements of the planetary gear set, respectively,
wherein the planetary gear set includes a double pinion planetary gear set including the plurality of rotation elements, and
wherein the plurality of rotation elements of the double pinion planetary gear set include:
a sun gear, as the first rotation element, fixedly connected to the drive pulley and connectable to the input shaft via the first clutch;
a ring gear, as the second rotation element, selectively connectable to a transmission housing by the brake; and
a carrier, as a third rotation element, fixedly connected to the input shaft.

11. A continuously variable powertrain apparatus comprising:
an input shaft;
a drive pulley and a driven pulley engaged to each other by a belt;
a switching mechanism engaged to the input shaft and the drive pulley to selectively switch a direction of power from the input shaft to the drive pulley by a plurality of first friction members and transmit the power;
a gear train engaged to the input shaft and a rotation shaft of the driven pulley to transmit a power of the input shaft to the rotation shaft of the driven pulley; and
a second friction member provided to selectively interrupt a power transmission path of the gear train,
wherein the switching mechanism includes:
a planetary gear set including a plurality of rotation elements having a first rotation element and a second rotation element; and
the plurality of first friction members including a first clutch and a brake connected to the first and second rotation elements of the planetary gear set, respectively,
wherein the planetary gear set includes a single pinion planetary gear set including the plurality of rotation elements, and
wherein the plurality of rotation elements of the single pinion planetary gear set includes:
a sun gear, as the first rotation element, fixedly connected to the drive pulley and selectively connectable to the input shaft via the first clutch;
a carrier, as the second rotation element, selectively connectable to a transmission housing by the brake; and
a ring gear, as a third rotation element, fixedly connected to the input shaft.

* * * * *